(12) United States Patent
Hart et al.

(10) Patent No.: US 11,016,514 B2
(45) Date of Patent: May 25, 2021

(54) CONTROL LINE STABILIZER FOR A PRESSURE REGULATOR

(71) Applicant: EMERSON PROCESS MANAGEMENT REGULATOR TECHNOLOGIES, INC., McKinney, TX (US)

(72) Inventors: Justin W. Hart, Melissa, TX (US); Tony A. Durant, McKinney, TX (US)

(73) Assignee: EMERSON PROCESS MANAGEMENT REGULATOR TECHNOLOGIES, INC., McKinney, TX (US)

(*) Notice: Subject to any disclaimer, the term of this patent is extended or adjusted under 35 U.S.C. 154(b) by 58 days.

(21) Appl. No.: 16/152,853

(22) Filed: Oct. 5, 2018

(65) Prior Publication Data

US 2020/0110429 A1 Apr. 9, 2020

(51) Int. Cl.
*F16K 17/06* (2006.01)
*G05D 16/16* (2006.01)
(Continued)

(52) U.S. Cl.
CPC ............ *G05D 16/16* (2013.01); *F16K 17/196* (2013.01); *F16K 17/26* (2013.01); *G05D 16/0636* (2013.01); *G05D 16/2095* (2019.01)

(58) Field of Classification Search
CPC ........ G05D 16/16; G05D 16/02; F16K 17/26; F16K 17/196
USPC ....... 137/489.5, 207, 487, 488, 315.05, 474, 137/505.13, 505.14, 505.2, 505.32, 513.3, 137/513.5, 111, 112, 113; 251/118, 167, 251/169, 282, 325
See application file for complete search history.

(56) References Cited

U.S. PATENT DOCUMENTS

| 841,469 A | * | 1/1907 | Turner | ................ | G05D 16/163 |
|           |   |        |        |                  | 137/489.5   |
| 2,121,936 A |   | 6/1938 | Thomas |                |             |

(Continued)

FOREIGN PATENT DOCUMENTS

GB 1285534 A 8/1972

OTHER PUBLICATIONS

"Type 112 Restrictor," Emerson Process Management, Instruction Manual, Jul. 2017.

(Continued)

*Primary Examiner* — Minh Q Le
(74) *Attorney, Agent, or Firm* — Marshall, Gerstein & Borun LLP

(57) ABSTRACT

A control line stabilizer includes a body defining an inlet chamber, an outlet chamber, a passageway connecting the inlet chamber and the outlet chamber, a first seat, and a second seat. A disc is disposed in the passageway and is movable between a first closed position, in which the disc engages the first seat, an open position, in which the disc is spaced away from the first seat and the second seat, and a second closed position in which the disc engages the second seat. A first spring is disposed in the outlet chamber and is operatively coupled to the disc. A second spring is disposed in the inlet chamber and is operatively coupled to the disc. The disc restricts fluid flow through the passageway by moving to the first closed position and by moving to the second closed position.

20 Claims, 9 Drawing Sheets

(51) Int. Cl.
G05D 16/20 (2006.01)
G05D 16/06 (2006.01)
F16K 17/26 (2006.01)
F16K 17/196 (2006.01)

(56) References Cited

U.S. PATENT DOCUMENTS

| | | | | |
|---|---|---|---|---|
| 2,487,418 | A | * | 11/1949 | Birkemeier ............ F16K 17/105 137/489.5 |
| 2,523,826 | A | * | 9/1950 | Heinzelman ......... G05D 16/163 137/487 |
| 3,085,589 | A | * | 4/1963 | Sands ..................... F16K 17/26 137/498 |
| 3,357,443 | A | * | 12/1967 | Brumm ................ G05D 16/163 137/116.5 |
| 3,683,957 | A | * | 8/1972 | Sands ..................... F16K 17/26 137/460 |
| 5,027,852 | A | | 7/1991 | McNeely |
| 5,230,362 | A | * | 7/1993 | Goodman ............. G05D 16/16 137/489 |
| 5,788,372 | A | * | 8/1998 | Jones ..................... B64D 27/26 137/513.3 |
| 7,533,690 | B2 | * | 5/2009 | Reinicke ............... F16K 15/183 137/487.5 |
| 8,136,545 | B2 | | 3/2012 | Jablonski |
| 8,381,761 | B2 | * | 2/2013 | Re ....................... F16K 31/1268 137/489.5 |

OTHER PUBLICATIONS

"Type LR128 Relief Valve or Backpressure Liquid Regulator," Emerson Process Management, Bulletin 71.4:LR128, Nov. 2014.
"Type MR105 Direct-Operated Pressure Reducing Regulators," Emerson Process Management, Instruction Manual, Dec. 2014.
"MR98 Series Backpressure Regulators, Relief and Differential Relief Valves," Emerson Process Management, Bulletin 71.4:MR98, May 2016.
"Type LR125 Pressure Reducing Liquid Regulator," Emerson Process Management, Bulletin 71.2:LR125, Sep. 2015.
"Type MR108 Direct-Operated Backpressure Regulators," Emerson Process Management, Bulletin 71.4:MR108, Jul. 2016.
International Search Report and Written Opinion, corresponding International Application No. PCT/US2019/053343, dated Dec. 19, 2019.

* cited by examiner

US 11,016,514 B2

CONTROL LINE STABILIZER FOR A PRESSURE REGULATOR

FIELD OF DISCLOSURE

The present disclosure generally relates to a pressure regulator, and, more particularly to a stabilizer of a pressure regulator.

BACKGROUND

Industrial processing plants use pressure regulators in a wide variety of applications such as, for example, controlling fluid flow (e.g., gas, liquid) in a processing operation. The regulation of flow of gas requires that a regulator valve provide and maintain a low flow rate of gas until the fluid flow system requires that the regulator valve provide a higher flow rate. However, changes in flow demand can cause sudden increases or decreases in pressure of the system, which contributes to instability in the regulator valve. Instability in the regulator system can impede the ability of the regulator to return back to steady state operation, and also can cause audible noise and vibration, leading to component wear and failure. Some systems are more susceptible to becoming unstable during transient operation (i.e., when flow demand changes quickly). For example, in a piping system with a short length of pipe immediately following the regulator valve and preceding the next component in the line, the regulator valve may overshoot or undershoot when a pump in the system turns on or off. The overshooting and undershooting of the regulator valve causes a sustained pressure oscillation in the system even after the transient condition has passed.

SUMMARY

In accordance with a first exemplary aspect, a pressure regulator system may include a valve comprising a valve body defining an inlet, an outlet, and a flow path connecting the inlet and the outlet. An actuator assembly may be configured to actuate the valve between an open position and a closed position in response to a fluid pressure that is receivable at the actuator assembly via a control line. A stabilizer may be disposed in the control line and may include a stabilizer body defining an inlet chamber, an outlet chamber, a passageway connecting the inlet chamber and the outlet chamber, a first seat, and a second seat. A disc may be disposed in the passageway and may be movable between an open position, in which the disc is spaced away from the first seat and the second seat, a first closed position, in which the disc engages the first seat, and a second closed position in which the disc engages the second seat. A first spring may be disposed in the outlet chamber and may be operatively coupled to the disc, and a second spring may be disposed in the inlet chamber and may be operatively coupled to the disc. The disc may be configured to restrict fluid flow through the passageway in response to a pressure imbalance between the inlet chamber and the outlet chamber.

In accordance with a second exemplary aspect, a control line stabilizer for a pressure regulating device may include a stabilizer body defining an inlet chamber, an outlet chamber, and a passageway connecting the inlet chamber and the outlet chamber. A disc may be disposed in the passageway and may be movable between an open position and a closed position. A first spring may be disposed in the outlet chamber and may be operatively coupled to the disc, and a second spring may be disposed in the inlet chamber and may be operatively coupled to the disc. The disc may restrict fluid flow through the passageway in the closed position.

In further accordance with any one or more of the foregoing first or second aspects, a pressure regulator system and a control line stabilizer may further include any one or more of the following preferred forms.

In a preferred form, the disc may include a bore fluidly connecting the inlet chamber and the outlet chamber of the stabilizer.

In a preferred form, a restrictor may be operatively coupled to the stabilizer body and may be in fluid communication with the inlet chamber and the outlet chamber of the stabilizer.

In a preferred form, the restrictor may be adjustable.

In a preferred form, the disc may compress the first spring in response to a first pressure imbalance when fluid pressure in the inlet chamber exceeds the fluid pressure in the outlet chamber.

In a preferred form, the disc may compress the second spring in response to a second pressure imbalance when fluid pressure in the outlet chamber exceeds fluid pressure in the inlet chamber.

In a preferred form, the valve may operate as a backpressure regulator.

In a preferred form, the valve may operate as a pressure-reducing regulator.

In a preferred form, the control line may be in fluid communication with the outlet of the valve such that the disc moves in response to a change in pressure downstream relative to the valve.

In a preferred form, the control line may be in fluid communication with the inlet of the valve such that the disc moves in response to a change in pressure upstream relative to the valve.

In a preferred form, the actuator assembly may be a pilot-operated device.

In a preferred form, when the disc of the stabilizer is in the open position, the inlet chamber and the outlet chamber of the stabilizer may be in fluid communication via a flow path around an outer edge of the disc.

In a preferred form, the disc may have a curved surface.

In a preferred form, the stabilizer body may define a first seat. The disc may be movable between a first closed position, in which the disc engages the first seat, and the open position, in which the disc is spaced away from the first seat.

In a preferred form, the stabilizer body may define a second seat. The disc may be movable between the first closed position, a second closed position, in which the disc engages the second seat, and the open position, in which the disc is spaced away from the first seat and the second seat.

DETAILED DESCRIPTION

Figure 1:
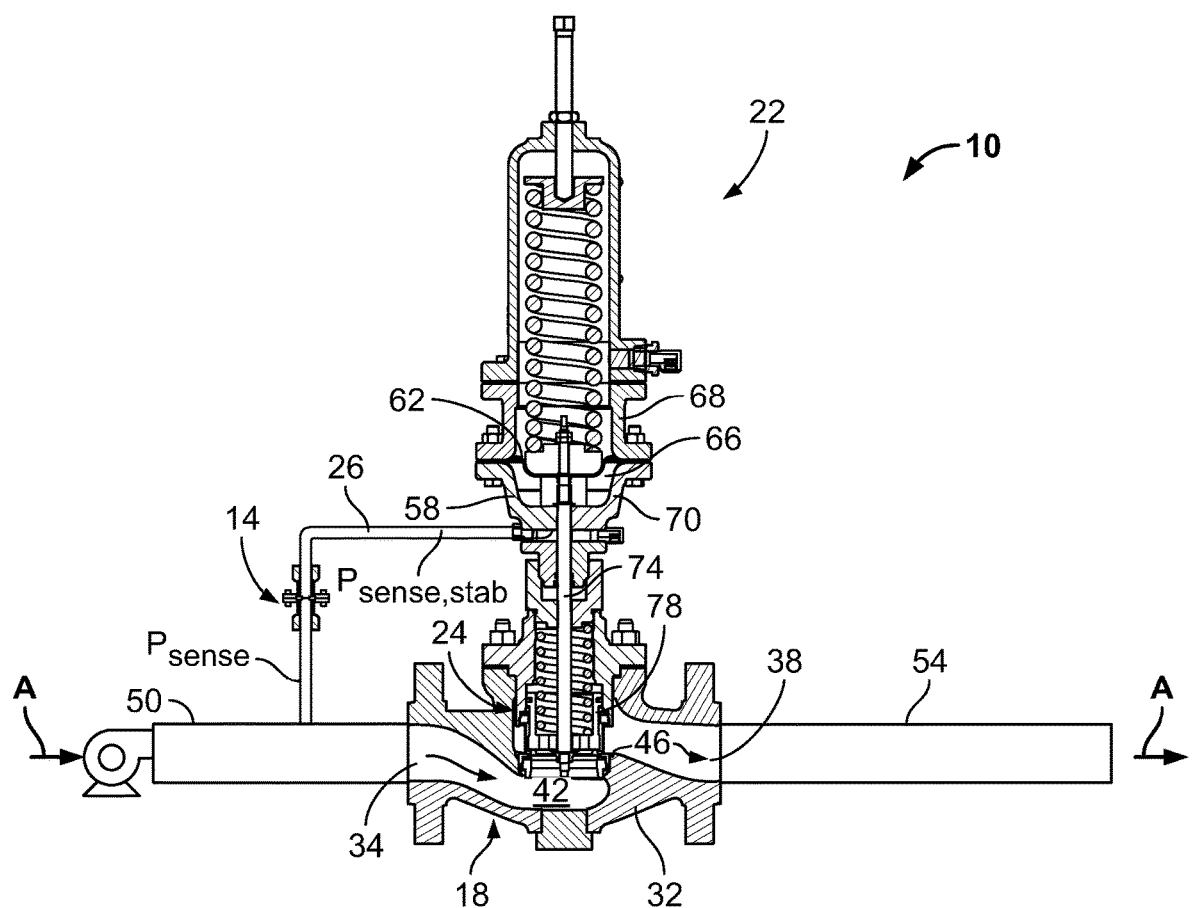
FIG. 1 is a cross-sectional view of a pressure regulator system and a first exemplary control line stabilizer installed in a control line of the pressure regulator system assembled in accordance with the teachings of the present disclosure.

In FIG. 1, a pressure regulator system 10 including a control line stabilizer 14 is constructed according to the teachings of the present disclosure. The system 10, which may be a backpressure regulator system, includes a regulator valve 18, an actuator assembly 22 coupled to the valve 18, a control assembly 24 operatively connected to the actuator assembly 22, and a control line 26 fluidly connecting the valve 18 with the actuator assembly 22. In this system 10 where fluid generally flows in a direction A, the control line stabilizer 14 is disposed in-line with the control line 26, and is configured to deliver a stable pressure signal to the actuator assembly 22 during transient operation.

The regulator valve 18 includes a valve body 32, which defines an inlet 34, an outlet 38, and a flow path 42 connecting the inlet 34 and the outlet 38. A valve seat 46 is disposed in the flow path 42 and is coupled to the valve body 32. One or more pumps may be located upstream from the valve 18 and pumps fluid (e.g., cooling water, lube oil, etc.) through an upstream conduit 50 (e.g., a pipe) that is coupled to the inlet 34 of the valve body 32. A downstream conduit 54 (e.g., a pipe) is coupled to the outlet 38 of the valve body 32 and typically recirculates the fluid back to the system (e.g., to a lube oil tank, etc.). In the example of FIG. 1, a first end of the control line 26 is in fluid communication with the upstream conduit 50 such that the stabilizer 14 may respond to changes in fluid pressure in the upstream conduit 50, and a second end of the control line 26 is in fluid communication with the actuator assembly 22. As will be described further below, the control line 26 of a different pressure regulator system may be in fluid communication with the downstream conduit 54 to deliver downstream pressure signals to the actuator assembly 22. In the system 10, the upstream conduit 50 and the downstream conduit 54 are tubes or pipes mounted to the valve body 32 at the inlet 34 and outlet 38, respectively. However, in other systems, the upstream conduit 50 may be a continuous extension of the inlet 34 of the valve body 32, and the downstream conduit 54 may be a continuous extension of the outlet 38 of the valve body 32.

The actuator assembly 22, which, as noted above, is operatively coupled to the valve 18, is configured to actuate the valve 18 between an open position and a closed position in response to a fluid pressure that is receivable at the actuator assembly 22 via the control line 26. The actuator assembly 22 includes a casing 58, a diaphragm 62 disposed in the actuator casing 58, and a sensing chamber 66 defined between the diaphragm 62 and the casing 58. In particular, the actuator casing 58 includes an upper casing 68 fastened to a lower casing 70, and the diaphragm 62 is disposed between the upper and lower casings 68, 70. The diaphragm 62 and the lower casing 70 at least partially define the sensing chamber 66, and the diaphragm 62 is movable in response to changes in pressure in the sensing chamber 66. The control line 26 is in fluid communication with the sensing chamber 66, and the stabilizer 14, which is disposed between the upstream conduit 50 and the sensing chamber 66 and is configured to deliver a stabilized pressure signal to the sensing chamber 66. Accordingly, the actuator assembly 22 responds to a pressure signal delivered via the control line 26 from the upstream conduit 50 and conditioned by the stabilizer 14. In response to the pressure signal, the diaphragm 62 moves, thereby causing the control assembly 24 to open or close the regulator valve.

The control assembly 24 is operatively connected to the diaphragm 62 of the actuator assembly 22, and moves (i.e., opens and closes the valve) in response to the movement of the diaphragm 62. The control assembly 24 includes a valve stem 74 and a control element 78 operatively connected to the valve stem 74. The control element 78 is moveable relative to the valve seat 46 between an open position, in which the control element 78 is spaced from the valve seat 46, and a closed positioned, in which the control element 78 engages the valve seat 46. An upper portion of the valve stem 74 is operatively coupled to the diaphragm 62 such that movement of the diaphragm causes movement of the valve stem 74.

The actuator assembly 22, via the control assembly 24, is responsive to pressure in the sensing chamber 66 to control the position of the control element 78 and, consequently, fluid flowing through the regulator system 10. For example, when the actuator assembly 22 senses a high pressure at the inlet 34 of the valve 18, the actuator assembly 22 actuates the control element 78 to open the valve 18. When the control element 78 is moved by the actuator assembly 22 to the fully open position, the control element 78 is spaced a distance from the valve seat 46 such that fluid is permitted to flow through the regulator system 10 via a valve port 80. If the working fluid is a liquid, the fluid is delivered to a reservoir, and if the working fluid is a gas, the fluid is vented into the atmosphere or sent to a flare or reclamation system. When the control element 78 is in the closed position, as shown in FIG. 1, the control element 78 sealingly engages the valve seat 46 such that fluid is prevented from flowing through the valve port 80.

Figure 2:
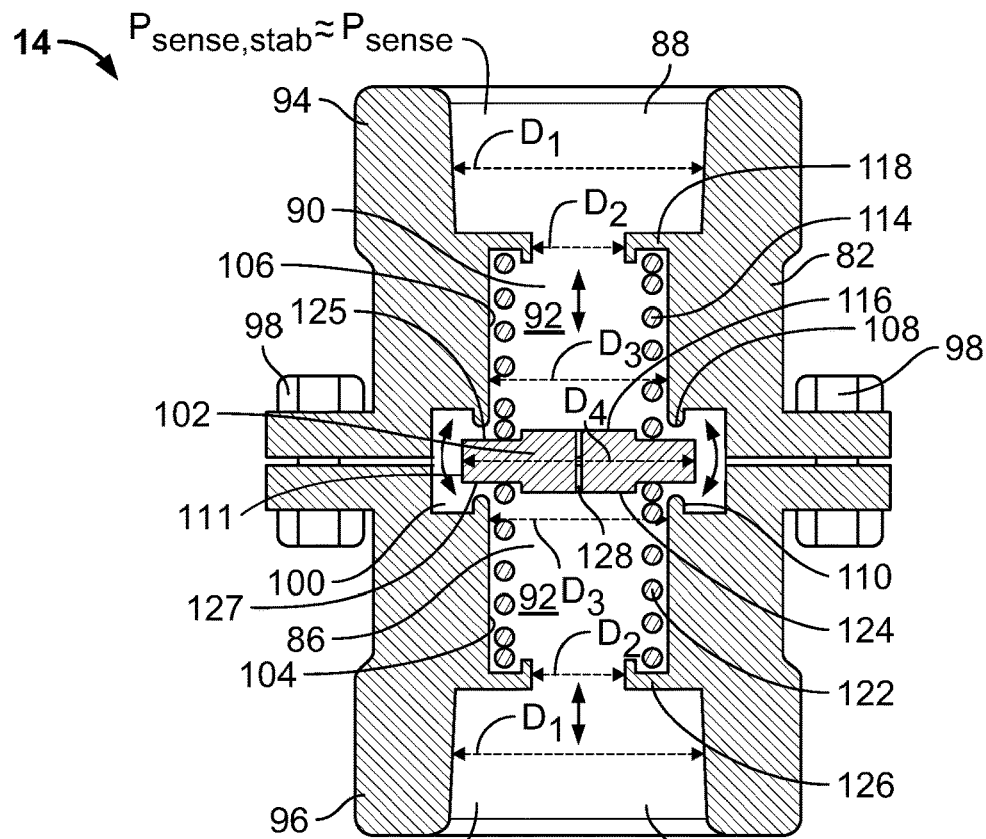
FIG. 2 is a cross-sectional view of the first exemplary control line stabilizer of FIG. 1 assembled in accordance with the teachings of the present disclosure and showing the control line stabilizer in a fully open position.
Figure 3:
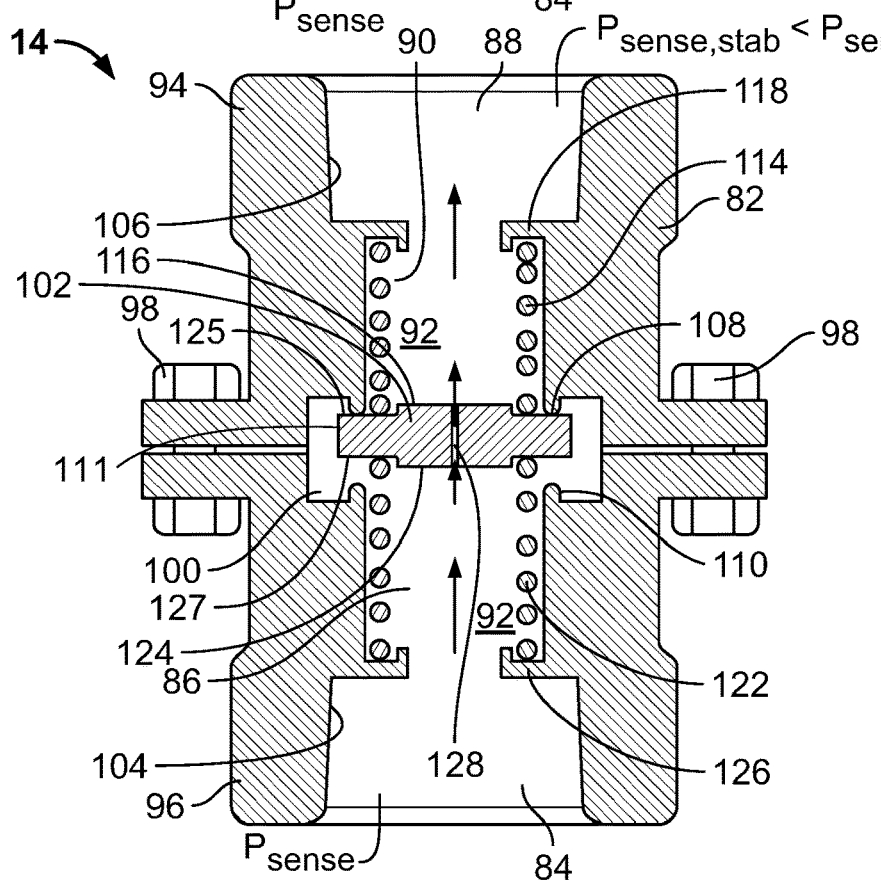
FIG. 3 is a cross-sectional view of the control line stabilizer of FIG. 1 in a first closed position.
Figure 4:
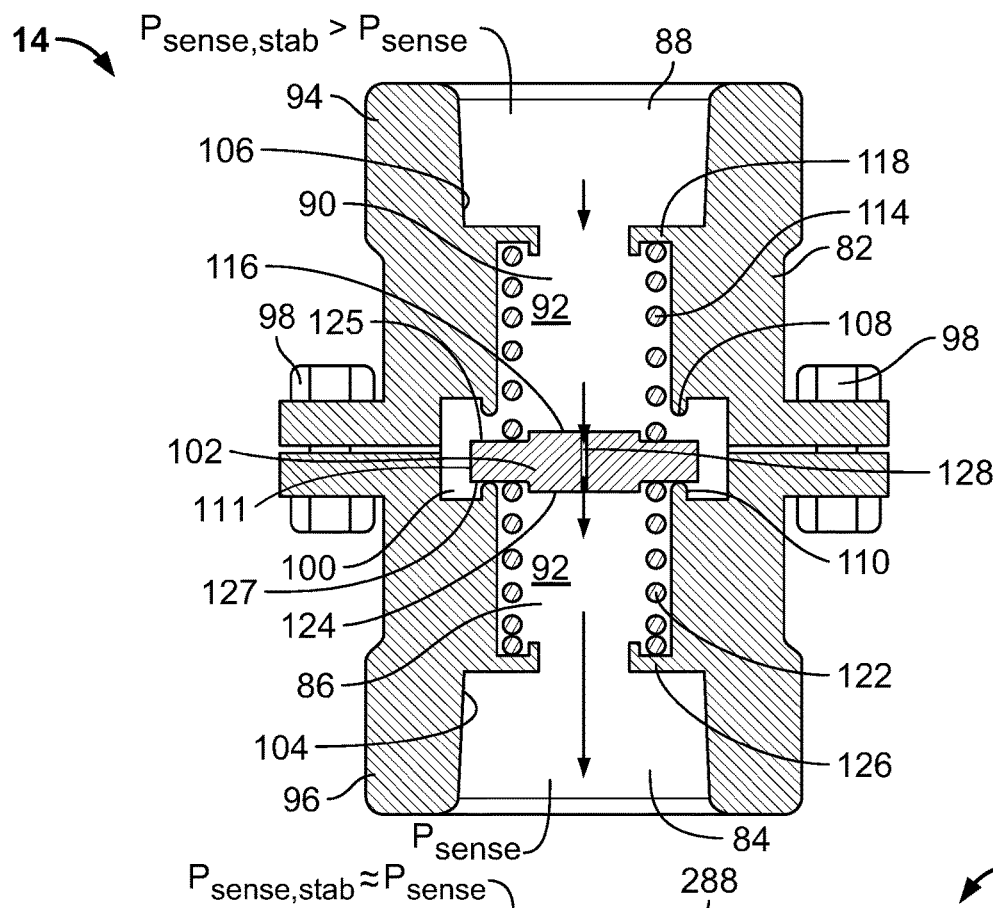
FIG. 4 is a cross-sectional view of the control line stabilizer of FIG. 1 in a second closed position.

Turning now to FIGS. 2-4, the control line stabilizer 14 of FIG. 1 is constructed according to the teachings of the present disclosure. The stabilizer 14 has a body 82 defining an inlet 84 extending into an inlet chamber 86, an outlet 88 extending into an outlet chamber 90, and a passageway 92 connecting the inlet 84 and the outlet 88. The stabilizer body 82 includes a first body portion 94 fastened to a second body portion 96 by a plurality of fasteners 98, and together define a disc cavity 100, which contains a disc 102. In other examples, the stabilizer body 82 may be an integrated component. As shown in FIG. 2, the passageway 92 is defined by interior walls 104, 106 of the first and second body portions 94, 96, respectively, of the stabilizer body 82. The passageway 92 varies in diameter along the length of the body 82 of the stabilizer 14. For example, the inlet 84 and the outlet 88 each has an inner diameter D1 and is separated from the respective inlet and outlet chambers 86, 90 by a portion of the inner wall 104, 106 having an inner diameter D2. The inner diameter D2 is smaller than both the inner diameter D1 of the inlet 84 and outlet 88 and an inner diameter D3 of each of the respective inlet and outlet chambers 86, 90. The disc 102 has a diameter D4 that is greater than both D3 of the inlet and outlet chambers 86, 90, and is disposed in the cavity 100 of the passageway 92. At the disc cavity 100, the interior wall 104 of the first body portion 94 forms a first seat 108, and the interior wall 106 of the second body portion 96 forms a second seat 110. The first and second seats 108, 110 separate the outlet chamber 90 and inlet chamber 86, respectively, from the disc cavity 100. Accordingly, the disc 102 is limited to axial movement within the disc cavity 100 and between first and second seats 108, 110.

The stabilizer 14 is configured to permit unrestricted fluid flow through the stabilizer body 82 during steady state operation, and to restrict fluid flow through the stabilizer body 82 in response to a pressure imbalance between the inlet chamber 86 and the outlet chamber 90 (i.e., during transient operation) by controlling the positioning of the disc 102 relative to the passageway 92 of the stabilizer body 82. For example, the disc 102 is movable between an open position as shown in FIG. 2, in which the disc 102 is spaced away from the first seat 108 and the second seat 110 of the stabilizer body 82, a first closed position as shown in FIG. 3, in which the disc 102 engages the first seat 108 of the stabilizer body 82, and a second closed position as shown in FIG. 4, in which the disc 102 engages the second seat 110. In the open position, fluid flows through the passageway 92, into the cavity 100, and around outer edges 111 of the disc 102. A first spring 114 is disposed in the outlet chamber 90 and is contained between an outlet-facing surface 116 of the disc 102 and a first spring seat 118 formed in the wall 106 between the outlet 88 and the outlet chamber 90. A second spring 122 is disposed in the inlet chamber 86 and is contained between an inlet-facing surface 124 of the disc 102 and a second spring seat 126 formed in the wall 104 between the inlet 84 and the inlet chamber 86. The first and second springs 114, 122 are operatively coupled to the disc 102 and balance the disc 102 in an open position within the disc cavity 100 during steady state operation. In particular, a flange extending around a circumference of the disc 102 defines a first groove 125 formed in the outlet-facing side 116 and a second groove 127 formed in the inlet-facing side 124 of the disc 102. The first and second grooves 125, 127 of the disc 102 provide spring seat surfaces that secure an end of the first and second springs 114, 122, respectively, in the outlet and inlet chambers 90, 86. The inlet-facing surface 124 and the outlet-facing surface 116 are generally flat to achieve a linear relationship between flow area and pressure differential in the stabilizer 14. However, the disc 102 may be contoured to achieve a non-linear relationship between flow area and pressure differential. In some examples, the springs 114, 122 may be adjustable to set the magnitude of a pressure change that causes movement of the disc 102.

Turning briefly to FIG. 1, when the pressure regulator system 10 is operational, the actuator assembly 22 regulates the inlet pressure of the valve 18 based on the inlet pressure signal $P_{sense}$ sensed in or at the inlet 34. The stabilizer 14 dampens the inlet pressure signal $P_{sense}$ so that the actuator assembly 22 gradually responds to sudden pressure changes. The disc 102 of the stabilizer 14 moves in response to a change in pressure upstream relative to the valve 18. Specifically, the disc 102 of the stabilizer 14 moves from the open position (FIG. 2) to either the first closed position (FIG. 3) or the second closed position (FIG. 4) depending on upstream pressure of the system 10. The fluid pressure signal $P_{sense}$ is communicated via the control line 26 and into the inlet chamber 86 of the stabilizer body 82, and the stabilizer 14 responds to the upstream pressure of the system 10. For example, when a first pump and/or second pump upstream of the system 10 turns on or off (e.g., when the system switches from running 0 to 1 pumps, 1 to 2 pumps, or 2 to 1 pump), a sudden increase or decrease in pressure in the upstream conduit 50 is communicated through the control line 26 to the stabilizer 14. The disc 102 of the stabilizer 14 moves to the first or second closed position, which presents a restriction in the control line 26 such that the abrupt change in pressure signal $P_{sense}$ is not immediately conveyed to the actuator assembly 22. Rather, the diaphragm 62 of the actuator assembly 22 receives the stabilized pressure signal $P_{sense, stab}$, which may be different from the pressure signal $P_{sense}$ as a result of the stabilizer 14, and responds by gradually moving upwards or downwards, causing the valve stem 74 to move the control element 78 away or towards (upwards or downwards when viewing FIG. 1) the valve seat 46 to increase or decrease fluid flow through the flow path 42 of the valve 18.

Turning back to FIG. 2, during normal or steady-state operation, the disc 102 is in the open position and gradual changes in the pressure signal $P_{sense}$ (whether increasing or decreasing) are communicated across the stabilizer 14 via a bidirectional flow path around the outer edges 111 of the disc 102 as indicated by the arrows in FIG. 2. Specifically, the pressure signal $P_{sense}$ passes through the first end of the control line 26, into the inlet 84 and through the inlet chamber 86 of the stabilizer 14, into the cavity 100 and around the disc 102, and out through the outlet chamber 90 and the outlet 88. Because the disc 102 does not present a significant restriction to the communication of such gradual pressure changes, the stabilized pressure signal $P_{sense, stab}$ is generally equal to pressure signal $P_{sense}$.

During transient operation, a sudden increase or decrease in pressure at the inlet 34 of the regulator system 10 causes a pressure imbalance across the disc 102. In response to an increase in pressure (e.g., an upstream pump turns on, and fluid pressure in the inlet chamber 86 exceeds fluid pressure in the outlet chamber 90), the disc 102 moves toward the first seat 108 (upwards when viewing FIG. 2), thereby compressing the first spring 114 until the first groove 125 of the flange of the disc 102 engages the first seat 108 and occupies the first closed position, as shown in FIG. 3. In the first closed position, the disc 102 blocks fluid from flowing around the outer edges 111 of the disc 102. Instead, the pressure change is communicated through a registration bore 128 formed in the disc 102. The registration bore 128 fluidly connects the inlet chamber 86 and the outlet chamber 90 of the stabilizer body 82, but it presents a significant restriction in the control line 26 (i.e., the disc 102 presents a greater restriction to flow through the control line 26 in either closed position than in the open position). In this way, the disc 102 acts to dampen the abrupt increase in the pressure signal $P_{sense}$ such that the stabilized pressure signal $P_{sense, stab}$ more gradually communicates the pressure change to the sensing chamber 66 of the actuator assembly 22, which improves the stability of the valve 18. Once the pressure is equalized across the disc 102 (e.g., a pressure reading at the inlet 34 is steady), the disc 102 returns to the open position, as shown in FIG. 2.

In response to a decrease in pressure (e.g., when an upstream pump turns off and the fluid pressure in the outlet chamber 90 exceeds fluid pressure in the inlet chamber 86), the disc 102 moves toward the second seat 110 (downwards when viewing FIG. 2), thereby compressing the second spring 122 until the second groove 127 of the flange of the disc 102 engages the second seat 110 and occupies the first closed position, as shown in FIG. 4. In the second closed position, the disc 102 of the stabilizer 14 again blocks fluid from flowing around the outer edges 111 of the disc 102, and instead causes fluid to flow through the registration bore 128 of the disc 102 as shown in FIG. 4. Accordingly, the disc 102 of the stabilizer 14 acts to dampen the abrupt decrease in the pressure signal $P_{sense}$ such that the stabilized pressure signal $P_{sense, stab}$ more gradually communicates the pressure change to the sensing chamber 66 of the actuator assembly 22, which improves the stability of the valve 18. Once again, when the pressure is equalized across the disc 102, the disc 102 returns to the open position, as shown in FIG. 2.

Figure 5:
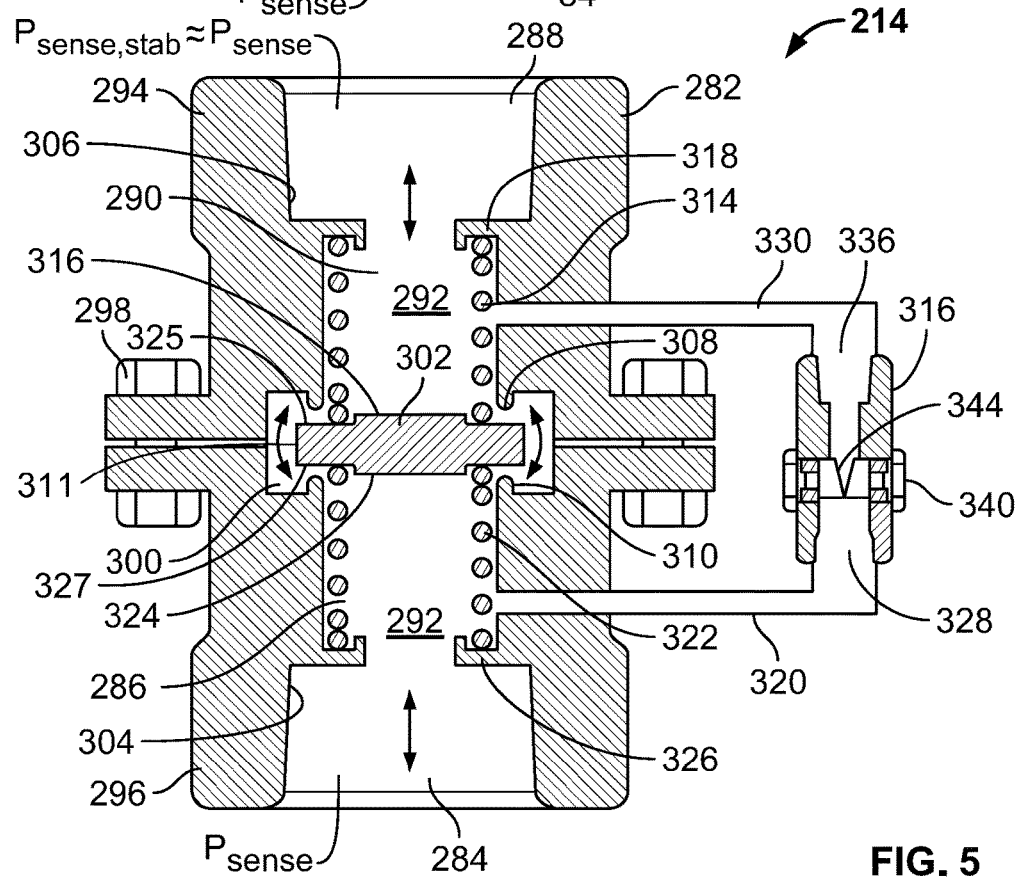
FIG. 5 is a cross-sectional view of a second exemplary control line stabilizer assembled in accordance with the teachings of the present disclosure and showing the control line stabilizer in a fully open position.
Figure 6:
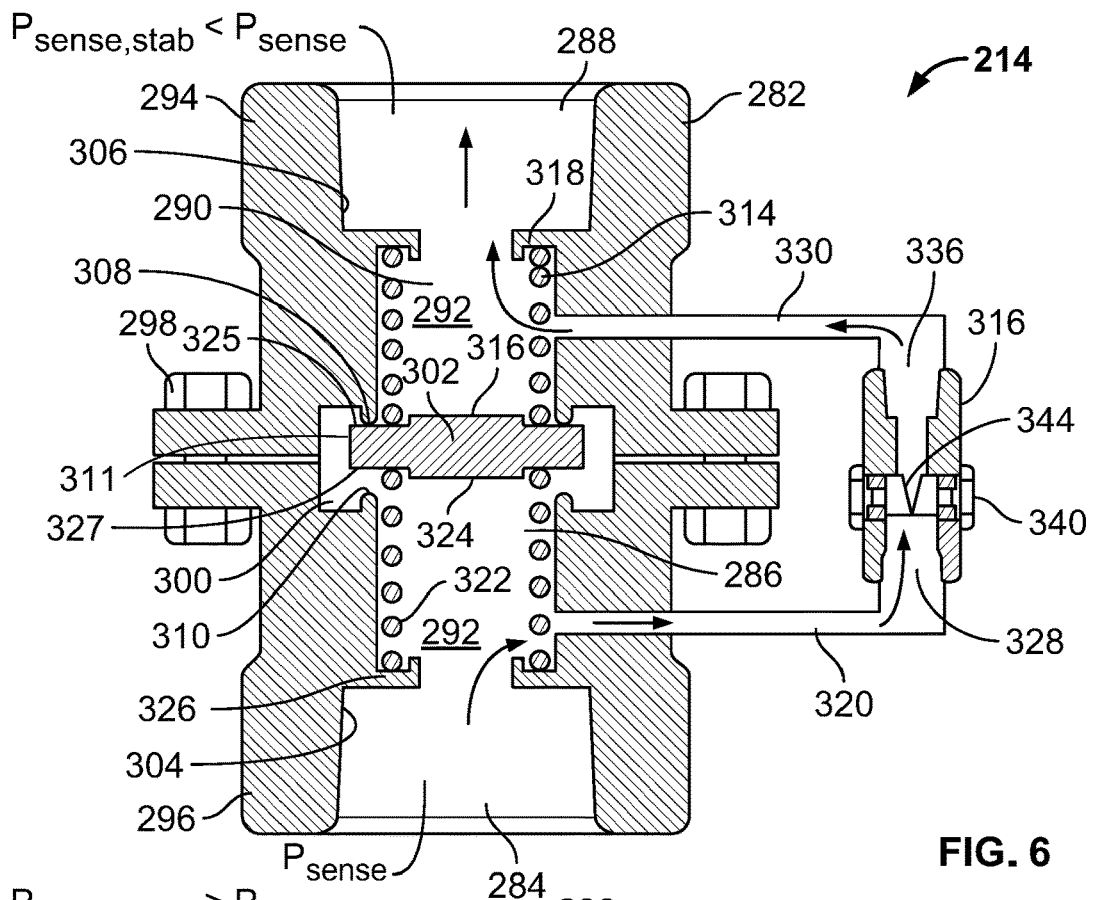
FIG. 6 is a cross-sectional view of the control line stabilizer of FIG. 5 in a first closed position.
Figure 7:
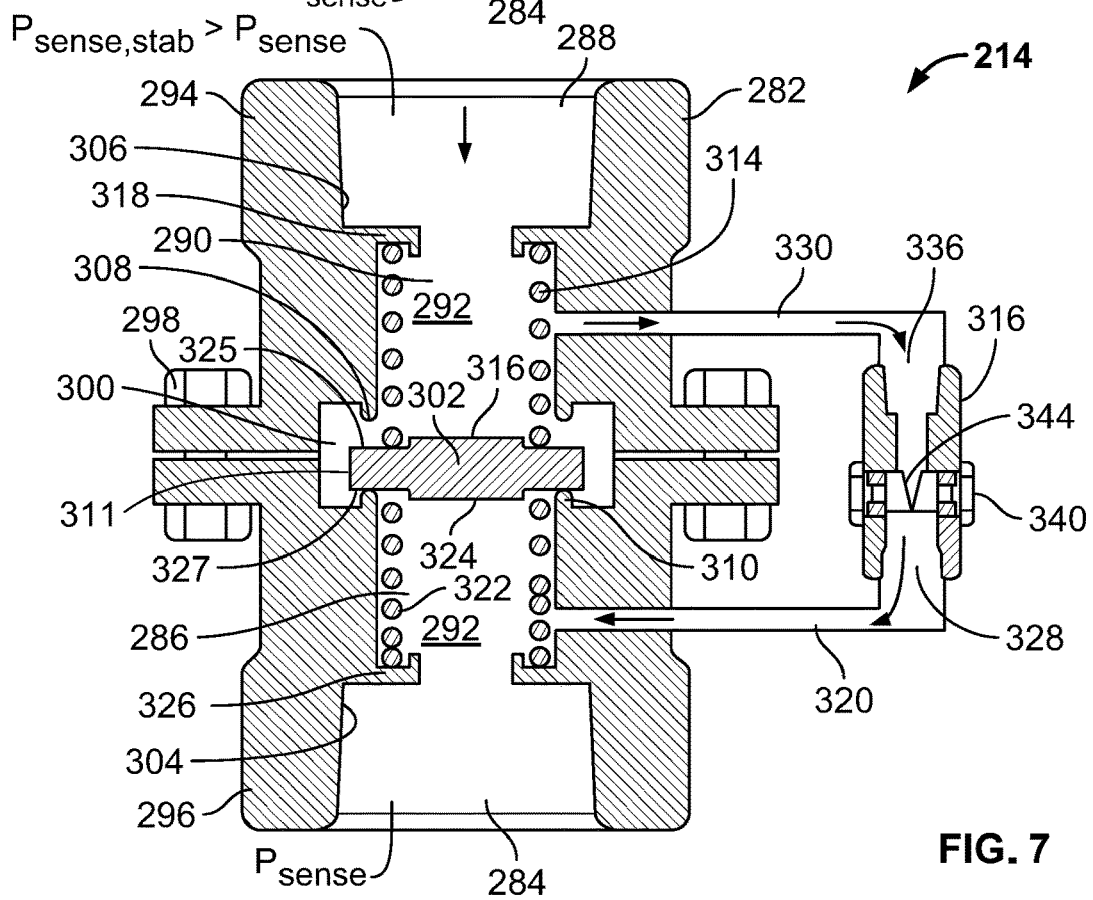
FIG. 7 is a cross-sectional view of the control line stabilizer of FIG. 5 in a second closed position.

In FIGS. 5-7, a second exemplary control line stabilizer 214 is constructed according to the teachings of the present disclosure. The second exemplary control line stabilizer 214 may be installed in-line with the control line 26 of the system 10 of FIG. 1 to restrict fluid flow between the conduit 26 and the sensing chamber 66 of the actuator assembly 22. The second exemplary control line stabilizer 214 is similar to the first exemplary control line stabilizer 14 of FIGS. 1-4. Thus, for ease of reference, and to the extent possible, the same or similar components of the control line stabilizer 214 will retain the same reference numbers as outlined above with respect to the first exemplary control line stabilizer 14, although the reference numbers will be increased by 200. However, the second exemplary control line stabilizer 214 differs from the first exemplary control line stabilizer 14 in the manner discussed below.

The second exemplary control line stabilizer 214 dampens (i.e., stabilizes) a pressure signal $P_{sense}$ received at an inlet 284 of a stabilizer body 282 by redirecting the pressure signal $P_{sense}$ through a restrictor 316, such as a 112 Restrictor, from Emerson Process Management Regulator Technologies. In the illustrated example, the restrictor 316 is operatively coupled to the stabilizer body 282 and is in fluid communication with an inlet chamber 286 and an outlet chamber 290 of the stabilizer 214. In particular, an inlet tube 320 fluidly connects the inlet chamber 286 of the stabilizer body 282 to an inlet 328 of the restrictor 316, and an outlet tube 330 fluidly connects the outlet chamber 290 of the stabilizer body 282 to an outlet 336 of the restrictor 316. In this particular example, the restrictor 316 is adjustable by rotating a knob 340 that is configured to change a size of an opening 344 of the restrictor 316, and thereby adjusting the volume of fluid permitted to flow between the inlet chamber 286 and the outlet chamber 290 of the stabilizer 214. In other examples, the restrictor 316 may include a plate having a fixed registration orifice to control the volume of fluid flow through the stabilizer 214. The inlet tube 320 may be coupled to a fluid passage formed in the wall 106 of a second portion 296 of the stabilizer body 282, and similarly, the outlet tube 330 may be coupled to a fluid passage formed in the wall 104 of a first portion 294 of the stabilizer body 282. Similarly, the inlet tube 320 may be connected to the control line 26 upstream of the control line stabilizer 214 and/or the outlet tube 330 may be connected to the control line 26 downstream of the control line stabilizer 214. In another example, the inlet and outlet tubes 320, 330 may extend through passages formed in the walls 104, 106 of the stabilizer body 282.

The second exemplary control line stabilizer 214 operates by moving a disc 302 in response to an abrupt change in pressure. The disc 302 is disposed in a cavity 300 of a passageway 292 and is movable between an open position as shown in FIG. 5, in which the disc 302 is spaced away from a first seat 308 and a second seat 310 of the stabilizer body 282, a first closed position as shown in FIG. 6, in which the disc 302 engages the first seat 308 of the stabilizer body 282, and a second closed position as shown in FIG. 7, in which the disc 302 engages the second seat 310. During normal operation, the disc 302 is located in the open position shown in FIG. 5. With the disc 302 in this position, gradual changes in pressure $P_{sense}$ (whether increasing or decreasing) are communicated across the stabilizer 214 via a bidirectional flow path around the outer edges 311 of the disc 302 as indicated by the arrows in FIG. 5. Because the disc 302 does not present a significant restriction to the communication of such gradual pressure changes, the stabilized pressure signal $P_{sense, stab}$ is generally equal to pressure signal $P_{sense}$.

In response to an abrupt increase in pressure $P_{sense}$, a pressure imbalance across the disc 302 forces the disc 302 to compress the first spring 314 and engage the first seat 308, which restricts or prevents the communication of the pressure change through the passageway 292. Instead, the pressure change is communicated through the restrictor 316 as indicated by the arrows in FIG. 6. The restrictor 316 acts to dampen the abrupt increase in the pressure signal $P_{sense}$ such that the stabilized pressure signal $P_{sense, stab}$ more gradually communicates the pressure change to the sensing chamber 66 of the actuator assembly 22, which improves the stability of the valve 18.

Similarly, in response to an abrupt decrease in pressure $P_{sense}$, a pressure imbalance across the disc 302 forces the disc 302 to compress the second spring 322 and engage the second seat 310, which restricts or prevents the communication of the pressure change through the passageway 292. Instead, the pressure change is communicated through the restrictor 316 as indicated by the arrows in FIG. 7. The restrictor 316 acts to dampen the abrupt decrease in the pressure signal $P_{sense}$ such that the stabilized pressure signal $P_{sense, stab}$ more gradually communicates the pressure change to the sensing chamber 66 of the actuator assembly 22, which improves the stability of the valve 18.

Figure 8:
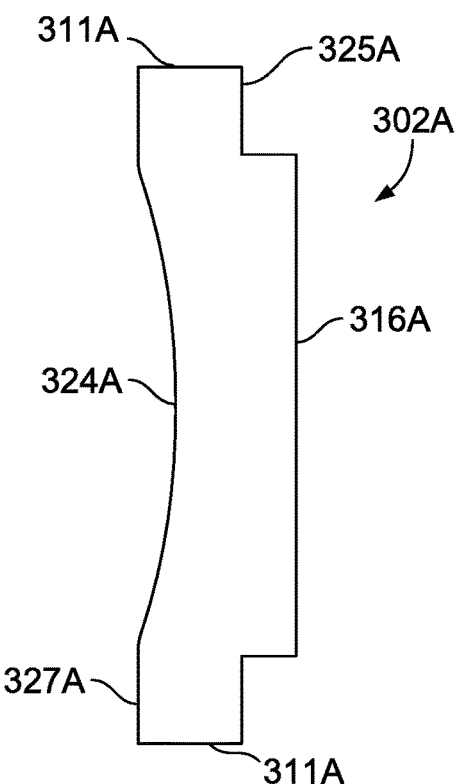
FIG. 8 is a side view of a stabilizer disc assembled in accordance with the teachings of the present disclosure.
Figure 9:
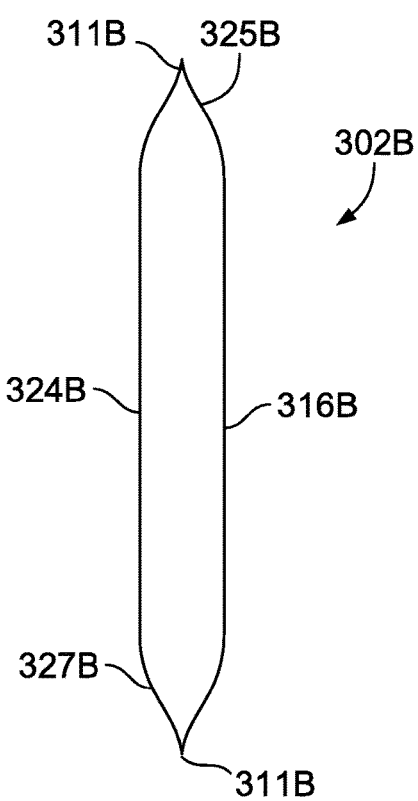
FIG. 9 is a side view of a different stabilizer disc assembled in accordance with the teachings of the present disclosure.
Figure 10:
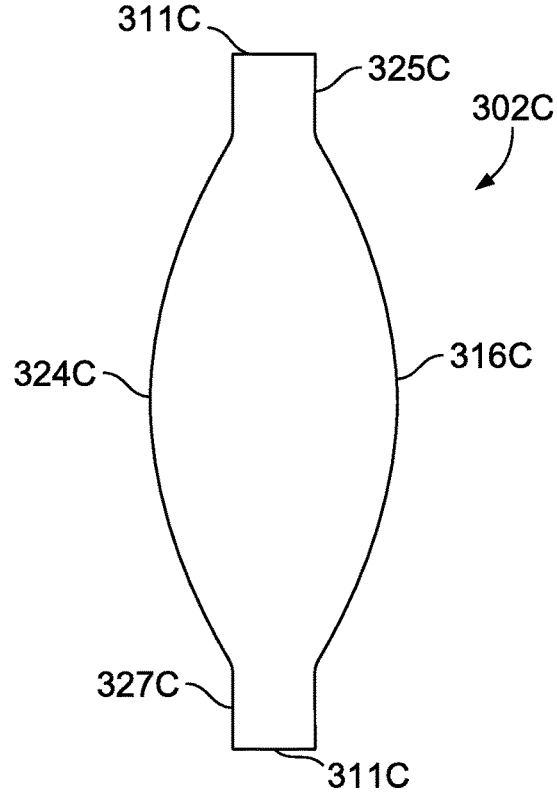
FIG. 10 is a side view of yet another stabilizer disc assembled in accordance with the teachings of the present disclosure.

In FIGS. 8-10, third, fourth, and fifth exemplary discs 302A, 302B, 302C, respectively, are constructed according to the teachings of the present disclosure. Each of the third, fourth, and fifth discs 302A, 302B, 302C may replace the first and second exemplary discs 102, 302 of the first or second exemplary stabilizers 14, 214 of FIGS. 1-7. The third exemplary disc 302A of FIG. 8 has a contoured inlet-facing surface 324A and a generally flat outlet-facing surface 316A. In particular, the curvature of the inlet-facing surface 324A is a concave to shape fluid flow during normal conditions and to achieve a desired flow profile. In the fourth exemplary disc 302B in FIG. 9, an inlet-facing surface 324B and an outlet-facing surface 316B are generally flat. However, a flange of the disc 402B has angled surfaces 325B, 327B such that the circumference of the disc 302B is narrow and pointed, which may promote fluid flow around the disc 302B when the disc 302B is in the open position during steady state operation. In FIG. 10, the fifth exemplary disc 302C has a curved inlet-facing surface 324C and a curved outlet-facing surface 316C. In this particular example, both surfaces 324C, 316C of the disc 302C are convex to achieve yet another flow profile during steady state operation. Any of the discs 302A, 302B, 302C may have a fixed registration orifice or bore extending through the disc 302A, 302B, 302C. As shown, the discs 302A, 302B, 302C may not provide a registration orifice, but instead, may restrict pressure communication signal by providing a poor seal in the closed positions to permit fluid to flow around the edges. The disc 102, 302, 302A, 302B, 302C for a control line stabilizer may be made of one or more suitable materials, such as, for example, steel, stainless steel, aluminum, various alloys (e.g., high nickel alloys), plastics, resins, and rubber over-molded onto metal. The control line stabilizer 14, 214 and components of the stabilizer 14, 214 may be manufactured by additive manufacturing techniques or other known methods.

Figure 11:
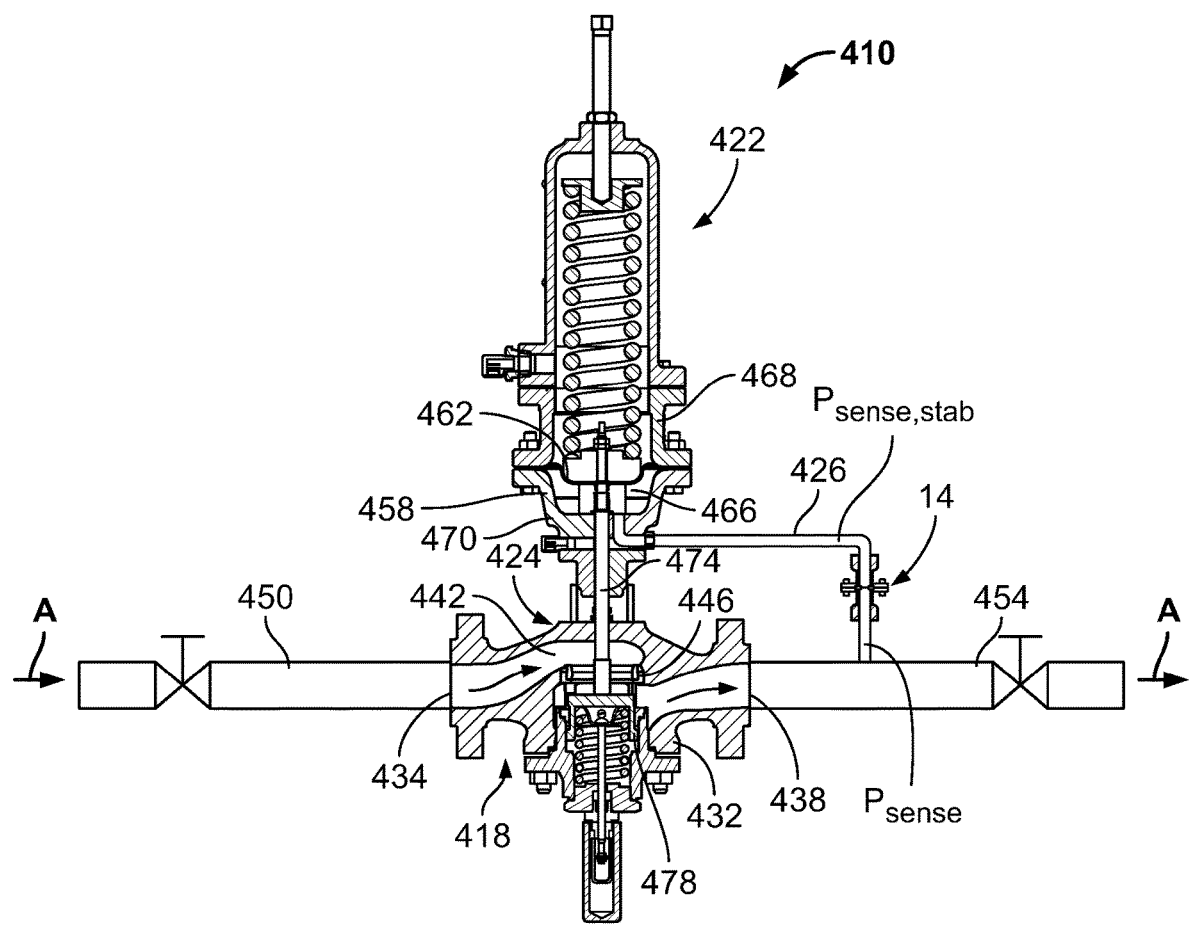
FIG. 11 is a cross-sectional view of a pressure regulator system and the first exemplary control line stabilizer installed in a control line of the pressure regulator system assembled in accordance with the teachings of the present disclosure.

In FIG. 11, a pressure regulator system 410 having a control line stabilizer 14 is constructed according to the teachings of the present disclosure. The pressure regulator system 410 of FIG. 11 is similar to the pressure regulator system of FIG. 1. While the second exemplary control line stabilizer 214 may be installed in the pressure regulator system 410 of FIG. 11, the first exemplary control line stabilizer 14 is used in the following description of FIG. 11. For ease of reference, and to the extent possible, the same or similar components of the pressure regulator system 410 will retain the same reference numbers as outlined above with respect to the first pressure regulator system 10, although the reference numbers will be increased by 400. However, the pressure regulator system 410 differs from the pressure regulator system 10 of FIG. 1 in the manner discussed below.

By comparison to the pressure regulator system 10 of FIG. 1, the system 410 is a pressure-reducing regulator system, such as, for example, a Type MR105 Series regulator from Emerson Process Management Regulator Technologies. Generally speaking, the inlet 434 of the valve 418 receives fluid from a fluid distribution system, for example, and the outlet 438 delivers fluid to an end-user facility such as a factory, a restaurant, an apartment building, etc., having one or more appliances. The control line stabilizer 14 is disposed in a control line 426 between a downstream conduit 454 and a sensing chamber 466 of an actuator assembly 422. Because the downstream conduit 454 is in fluid communication with an outlet 438 of a valve 418, the disc 102 of the stabilizer 14 moves in response to a change in pressure downstream relative to a valve body 432. During normal or steady-state operation, the disc 102 is in the open position and is balanced by the opposing forces of the first and second springs 114, 122. In the open position, the sensing chamber 466 of the actuator assembly 422 may sense downstream pressure without any restriction or time lag. However, and as discussed above, a sudden pressure increase or decrease in the downstream conduit 454, for example, causes the disc 102 to move toward the first seat 108 or second seat 110, and restrict fluid flow through the passageway 92 in the first or second closed positions. In this way, the stabilizer 14 acts to dampen abrupt changes in the pressure signal $P_{sense}$ such that the stabilized pressure signal $P_{sense, stab}$ more gradually communicates the pressure change to the sensing chamber 466 of the actuator assembly 422. A diaphragm 462 of the actuator assembly 422 responds to the stabilized pressure signal $P_{sense, stab}$, thereby causing a valve stem 474 to move a control element 478 away or toward a valve seat 446 to increase or decrease fluid flow through a flow path 442 of the valve 420.

Figure 12:
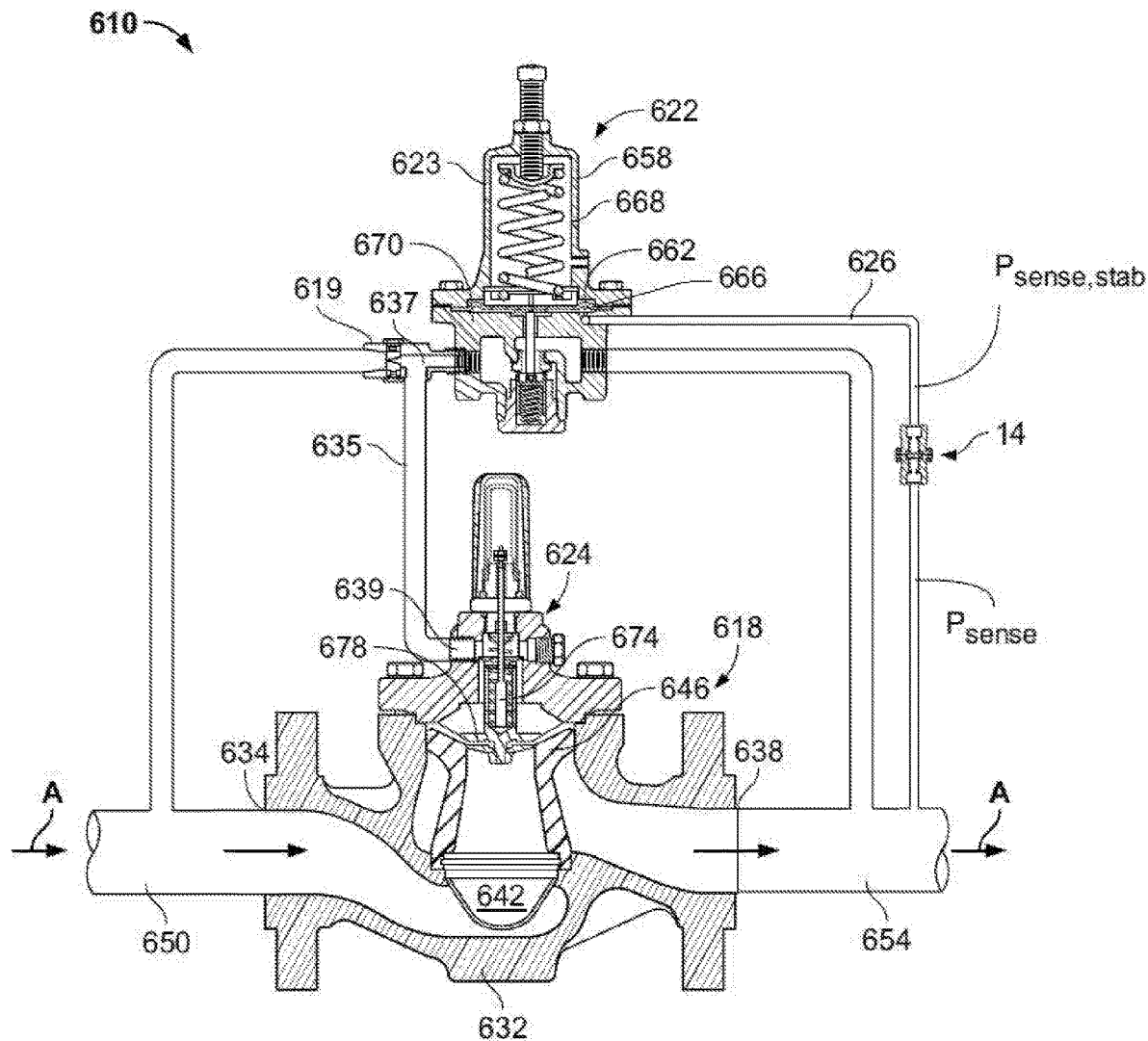
FIG. 12 is a cross-sectional view of a pilot-operated pressure regulator system and the first exemplary control line stabilizer installed in a control line of the pressure regulator system assembled in accordance with the teachings of the present disclosure.

In FIG. 12, a pressure regulator system 610 having a control line stabilizer 14 is constructed according to the teachings of the present disclosure. The pressure regulator system 610 of FIG. 12 is similar to the pressure regulator system of FIG. 1, however, the pressure regulator system 610 is pilot-operated. While the second exemplary control line stabilizer 214 may be installed in the pressure regulator system 410 of FIG. 12, the first exemplary control line stabilizer 14 is used in the following description of FIG. 12. For ease of reference, and to the extent possible, the same or similar components of the pressure regulator system 610 will retain the same reference numbers as outlined above with respect to the first pressure regulator system 10, although the reference numbers will be increased by 600. The pressure regulator system 610 differs from the pressure regulator system 10 of FIG. 1 in the manner discussed below. The pressure regulator system 610 is a pilot-operated pressure-reducing regulator, such as a Type LR128 regulator from Emerson Process Management Regulator Technologies. Additionally, the control line stabilizers 14, 214 may be installed in a pilot-operated pressure regulator such as the pressure regulator disclosed in U.S. Pat. No. 8,136,545, the entirety of which is incorporated by reference.

Generally, the pressure regulator system 610 is a pressure-reducing regulator system, and the control line stabilizer 14 is disposed in a control line 626 that extends between a downstream conduit 654 and a sensing chamber 666 of an actuator assembly 622. Because the downstream conduit 654 is in fluid communication with an outlet 638 of a valve 618, the disc 102 of the stabilizer 14 moves in response to a change in pressure downstream relative to a valve body 632. In FIG. 12, the valve 618 is operatively coupled to a control assembly 624, and a pilot valve 623 operates the actuator assembly 622. The actuator assembly 622 is operatively coupled to the control assembly 624 by way of first and second connecting conduits 635, 637 extending between the pilot valve 623 and the regulator valve 618. The control assembly 624 includes a loading pressure inlet 639, which is fluidly connected to the connecting conduit 635. The connecting conduit 635 transmits an inlet fluid pressure (i.e., loading fluid pressure) to the loading pressure inlet 639 of the control assembly 624, and transmits loading fluid pressure to the pilot valve 623. The control line stabilizer 14 operates in the manner described above to dampen abrupt changes in the pressure signal $P_{sense}$ such that the stabilized pressure signal $P_{sense, stab}$ more gradually communicates the pressure change to the sensing chamber 666 of the actuator assembly 622. The actuator assembly 622 either opens or closes to permit fluid to flow through to the downstream conduit 654, which either draws fluid pressure away from the loading pressure inlet 639 or towards the loading pressure inlet 639 to cause a control element 678 to move away or toward a valve seat 646 of the valve 618.

Figure 13:
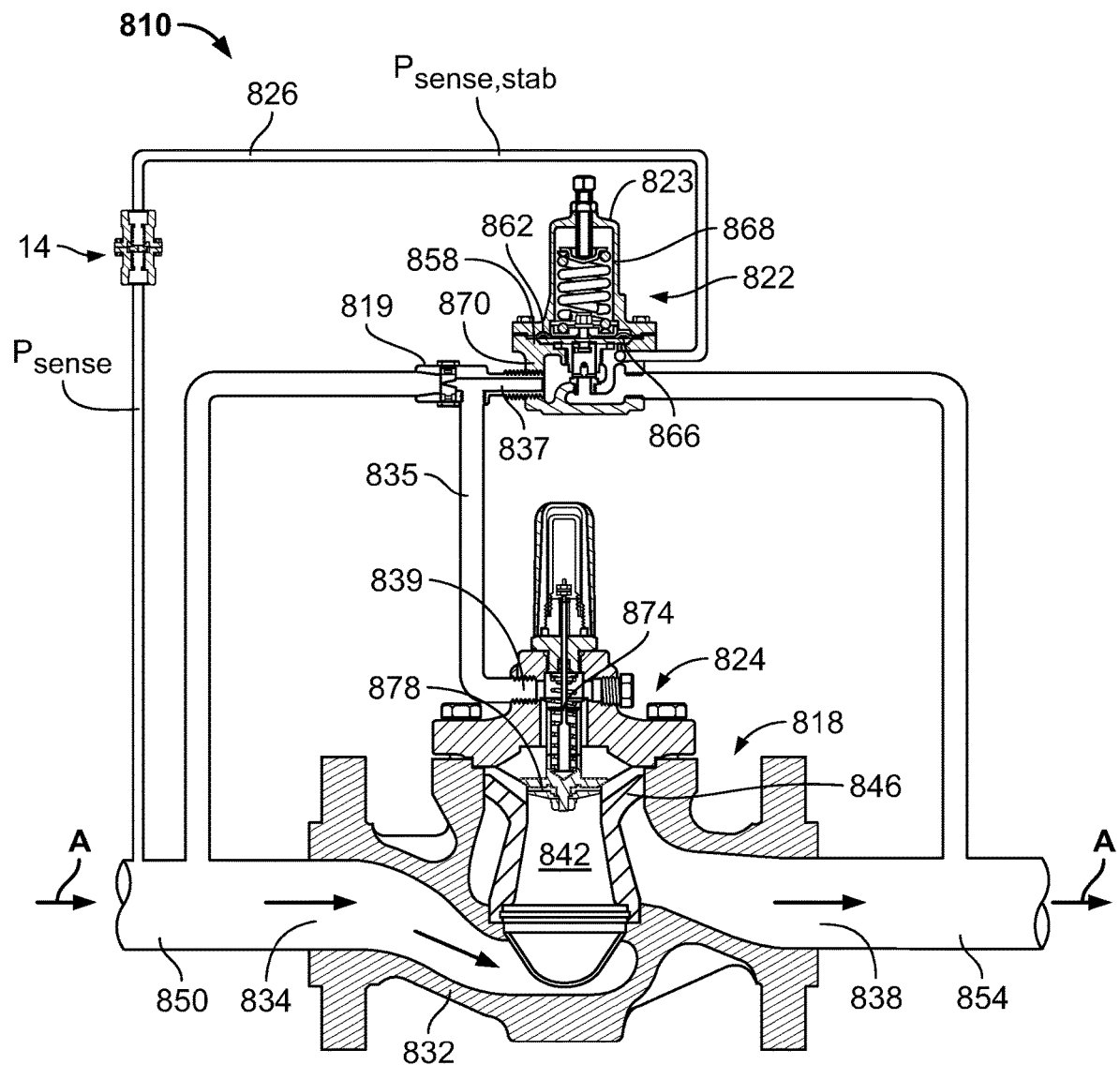
FIG. 13 is a cross-sectional view of a pilot-operated pressure regulator system and the first exemplary control line stabilizer installed in a control line of the pressure regulator system assembled in accordance with the teachings of the present disclosure.

In FIG. 13, a pressure regulator system 810 having a control line stabilizer 14 is constructed according to the teachings of the present disclosure. The pressure regulator system 810 of FIG. 13 is similar to the pressure regulator system of FIG. 12. While the second exemplary control line stabilizer 214 may be installed in the pressure regulator system 810 of FIG. 13, the first exemplary control line stabilizer 14 is illustrated in FIG. 13. For ease of reference, and to the extent possible, the same or similar components of the pressure regulator system 810 will retain the same reference numbers as outlined above with respect to the pressure regulator system 610 of FIG. 12, although the reference numbers will be increased by 200. The pressure regulator system 810 is a pilot-operated backpressure regulator, such as a Type LR125 regulator from Emerson Process Management Regulator Technologies. By comparison to the pressure regulator system 610 of FIG. 12, the system 810 is a backpressure regulator system, and the control line stabilizer 14 is disposed in a control line 846 that extends between an upstream conduit 850 and a sensing chamber 866 of an actuator assembly 822. Because the upstream conduit 850 is in fluid communication with an inlet 834 of a valve 818, the disc 102 of the stabilizer 14 moves in response to a change in pressure upstream relative to a valve body 832.

Figure 14:
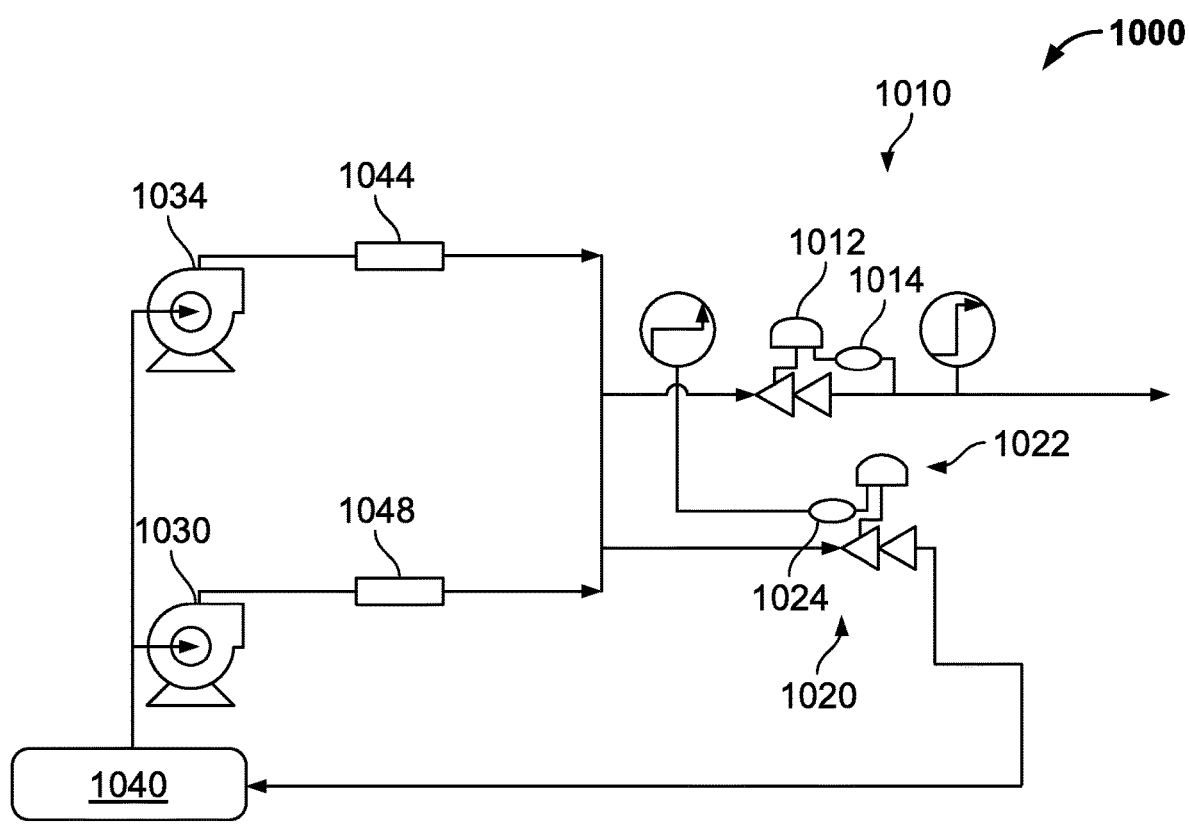
FIG. 14 is a schematic of a lube oil skid system including a pressure reducing regulator, a backpressure regulator, and first and second control line stabilizers assembled in accordance with the teachings of the present disclosure.

FIG. 14 is a schematic of an example lube oil skid system 1000 constructed according to the teachings of the present disclosure. The schematic 1000 includes a pressure reducing regulator system 1010 including a pressure regulator 1012 and first control line stabilizer 1014, (e.g., the system 410 of FIG. 11) and a backpressure regulator system 1020 including a backpressure regulator 1022 and a second control line stabilizer 1024 (e.g., the system 10 of FIG. 1). In this system 1000, a first pump 1030 and a second pump 1034 are disposed upstream from both the pressure reducing regulator system 1010 and the backpressure regulator system 1020. The first and second control line stabilizers 1014, 1024 assist in stabilizing the system 1000 when the system 1000 switches from operating 0 to 1 pumps, 1 to 2 pumps, or 2 to 1 pumps. In this system 1000, the working fluid is a lube oil and is stored in a reservoir 1040. Depending on the requirements of the system 1000, one or more pumps 1030, 1034 pumps the lube oil through one or more filters 1044, 1048, to the pressure reducing regulator system 1010 and the backpressure regulator system 1020. If a pressure at an inlet of the backpressure regulator system 1020 is too high, the backpressure regulator 1022 delivers the lube oil back to the oil reservoir 1040. The pressure reducing regulator 1012 regulates the flow of lube oil through the system 1000 to deliver the oil to equipment bearings, seals, or servo-controls. In this application, the control line stabilizer 1014 may or may not (depending upon the specific system configuration) be needed on the pressure reducing regulator 1010. Stabilizing the pressure upstream of the regulators 1012, 1022 with the back pressure regulator control line stabilizer 1024 may be enough to provide overall system stability.

The control line stabilizers 14, 214 disclosed herein are exemplary and may be altered in a number of ways to work in any industry that uses pressure regulators and those systems that exhibit instability. For example, a stabilizer body 82, 282 may be shaped to provide a particular passageway 92, 292 to characterize fluid flow through the stabilizer 14, 214. The first exemplary stabilizer 14 may be configured to provide a disc 102 having a wider registration bore 128 for applications using a viscous liquid, or a narrow registration bore 128 for applications using natural gas. In another example, the second exemplary stabilizer 214 may include a disc 302 having a fixed registration bore similar to the registration bore 128 of the first exemplary stabilizer disc 102. Depending on the requirements of the system, the control line stabilizer 14, 214 may be altered to provide a spring configuration having more than two springs. Different combinations of springs, registration size of the disc bore 128, and disc shape may be changed to provide a customized stabilizer 14, 214 for a particular application. Additionally, the control line stabilizer 14, 214 of the present disclosure may be installed in both self-operated regulators, and pilot-operated regulators.

From the foregoing, the present disclosure advantageously provides a pressure regulator system 10, 410, 610, 810 including a control line stabilizer 14, 214 that may improve stability of pressure regulator valves 18, 418, 618, 818 during transient operation, and therefore improve system response to sudden pressure changes in the system. The control line stabilizers 14, 214 respond automatically to upstream or downstream pressure changes, and are configured to dampen oscillations in the regulator valve 18, 418, 618, 818 that are caused by sudden changes in pressure. Additionally, the control line stabilizers 14, 214 allow unrestricted fluid flow through the stabilizer 14, 214 during steady state operation. For example, the control line stabilizer 14, 214 disclosed herein slows down a pressure signal to the sensing chamber 66, 466, 666, 866 only in response to abrupt pressure changes. The control line stabilizer 14, 214 of the present disclosure may have either a fixed registration so that pressure registration to the sensing chamber 66, 466, 666, 866 is never entirely closed, or an adjustable registration so that an end user may tune the system 10, 410, 610, 810 manually.

The figures and description provided herein depict and describe preferred embodiments of a control line stabilizer and pressure regulator system for purposes of illustration only. One skilled in the art will readily recognize from the foregoing discussion that alternative embodiments of the components illustrated herein may be employed without departing from the principles described herein. Thus, upon reading this disclosure, those of skill in the art will appreciate still additional alternative structural and functional designs for control line stabilizers. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the methods and components disclosed herein without departing from the spirit and scope defined in the appended claims.

What is claimed:

1. A pressure regulator system, comprising:
a valve comprising:
a valve body defining an inlet, an outlet, and a flow path connecting the inlet and the outlet;
an actuator assembly configured to actuate the valve between an open position and a closed position in response to a fluid pressure that is receivable at the actuator assembly via a control line; and
a stabilizer disposed in the control line, the stabilizer comprising:
a stabilizer body defining an inlet chamber, an outlet chamber, a passageway connecting the inlet chamber and the outlet chamber, a first seat, and a second seat;
a disc disposed in the passageway and movable between an open position, in which the disc is spaced away from the first seat and the second seat, a first closed position, in which the disc engages the first seat, and a second closed position in which the disc engages the second seat;
a first spring disposed in the outlet chamber and operatively coupled to the disc; and
a second spring disposed in the inlet chamber and operatively coupled to the disc;

wherein the disc is configured to restrict fluid flow through the passageway in response to a pressure imbalance between the inlet chamber and the outlet chamber.

2. The pressure regulator system of claim 1, wherein the disc includes a bore fluidly connecting the inlet chamber and the outlet chamber of the stabilizer.

3. The pressure regulator system of claim 1, further comprising a restrictor operatively coupled to the stabilizer body and in fluid communication with the inlet chamber and the outlet chamber of the stabilizer.

4. The pressure regulator system of claim 3, wherein the restrictor is adjustable.

5. The pressure regulator system of claim 1, wherein the disc compresses the first spring in response to a first pressure imbalance, where fluid pressure in the inlet chamber exceeds fluid pressure in the outlet chamber.

6. The pressure regulator system of claim 5, wherein the disc compresses the second spring in response to a second pressure imbalance where fluid pressure in the outlet chamber exceeds fluid pressure in the inlet chamber.

7. The pressure regulator system of claim 1, wherein the valve operates as a backpressure regulator.

8. The pressure regulator system of claim 1, wherein the valve operates as a pressure-reducing regulator.

9. The pressure regulator system of claim 1, wherein the control line is in fluid communication with the outlet of the valve such that the disc moves in response to a change in pressure downstream relative to the valve.

10. The pressure regulator system of claim 1, wherein the control line is in fluid communication with the inlet of the valve such that the disc moves in response to a change in pressure upstream relative to the valve.

11. The pressure regulator system of claim 1, wherein the actuator assembly is pilot-operated device.

12. The pressure regulator system of claim 1, wherein when the disc of the stabilizer is in the open position, the inlet chamber and the outlet chamber of the stabilizer are in fluid communication via a flow path around an outer edge of the disc.

13. The pressure regulator system of claim 1, wherein the disc has a curved surface.

14. A control line stabilizer for a pressure regulating device, the stabilizer comprising:

a stabilizer body defining an inlet chamber, an outlet chamber, and a passageway connecting the inlet chamber and the outlet chamber;
a disc disposed in the passageway and that is movable between an open position and a closed position;
a first spring disposed in the outlet chamber and operatively coupled to the disc;
a second spring disposed in the inlet chamber and operatively coupled to the disc; and
a restrictor including an inlet, an outlet, and a passageway connecting the inlet and the outlet, the inlet of the restrictor being coupled to the inlet chamber of the stabilizer body via the passageway and the outlet coupled to the outlet chamber of the stabilizer body via the passageway;
wherein the disc restricts fluid flow through the passageway in the closed position.

15. The control line stabilizer of claim 14, wherein the disc includes a bore fluidly connecting the inlet chamber and the outlet chamber of the stabilizer.

16. The control line stabilizer of claim 14, wherein the restrictor is adjustable.

17. The control line stabilizer of claim 14, wherein when the disc of the stabilizer is in the open position, the inlet chamber and the outlet chamber of the stabilizer are in fluid communication via a flow path around an outer edge of the disc.

18. The control line stabilizer of claim 14, wherein the stabilizer body defines a first seat, the disc movable between a first closed position, in which the disc engages the first seat, and the open position, in which the disc is spaced away from the first seat.

19. The control line stabilizer of claim 18, wherein the stabilizer body defines a second seat, the disc movable between the first closed position, a second closed position, in which the disc engages the second seat, and the open position, in which the disc is spaced away from the first seat and the second seat.

20. The control line stabilizer of claim 14, wherein the restrictor further comprises an inlet tube connecting the inlet chamber of the stabilizer body to the inlet of the restrictor and an outlet tube connecting the outlet chamber of the stabilizer body to the outlet of the restrictor.

* * * * *